(12) United States Patent
Goralwalla et al.

(10) Patent No.: US 7,010,552 B2
(45) Date of Patent: Mar. 7, 2006

(54) OPTIMIZING COMMAND EXECUTION IN DATABASE SYSTEMS THAT PROVIDE SUPPORT FOR UPDATABLE SCROLLABLE CURSORS

(75) Inventors: Iqbal A. Goralwalla, Pickering (CA); Michael J. Winer, Markham (CA); David C. Sharpe, Toronto (CA); Matthew A. Huras, Ajax (CA)

(73) Assignee: International Business Machines Corporation, Armonk, NY (US)

( * ) Notice: Subject to any disclaimer, the term of this patent is extended or adjusted under 35 U.S.C. 154(b) by 619 days.

(21) Appl. No.: 09/872,827

(22) Filed: May 31, 2001

(65) Prior Publication Data
US 2002/0042788 A1    Apr. 11, 2002

(30) Foreign Application Priority Data
Oct. 6, 2000    (CA) .................................... 2322603

(51) Int. Cl.
*G06F 17/30*    (2006.01)
(52) U.S. Cl. ........................................ 707/203; 707/102
(58) Field of Classification Search ............. 707/1–10, 707/102, 103, 104.1, 201–204, 103 R
See application file for complete search history.

(56) References Cited

U.S. PATENT DOCUMENTS

| | | | | |
|---|---|---|---|---|
| 4,536,837 A | | 8/1985 | Olson et al. ................. | 701/205 |
| 5,333,303 A | * | 7/1994 | Mohan ......................... | 714/20 |
| 5,440,727 A | * | 8/1995 | Bhide et al. ................. | 711/117 |
| 5,455,946 A | * | 10/1995 | Mohan et al. .............. | 707/202 |
| 5,546,579 A | * | 8/1996 | Josten et al. ................... | 707/8 |
| 5,574,902 A | * | 11/1996 | Josten et al. ................... | 707/1 |
| 5,592,664 A | * | 1/1997 | Starkey ......................... | 707/1 |
| 5,758,357 A | | 5/1998 | Barry et al. ................. | 707/202 |
| 5,822,749 A | | 10/1998 | Agarwal ........................ | 707/2 |
| 5,893,097 A | * | 4/1999 | Hayata et al. ................. | 707/10 |
| 5,907,848 A | * | 5/1999 | Zaiken et al. ............... | 707/202 |
| 6,161,109 A | * | 12/2000 | Matamoros et al. ........ | 707/203 |
| 6,591,269 B1 | * | 7/2003 | Ponnekanti ................. | 707/100 |

* cited by examiner

*Primary Examiner*—Leslie Wong
(74) *Attorney, Agent, or Firm*—Sawyer Law Group LLP

(57) ABSTRACT

A procedure optimizes command execution in a database system. According to one embodiment, the database system stores data records on data pages, and provides an identifier for each data page. The identifier indicates when any of the data records contained in the data page were last modified. A data record is selected from a data page and copied to a second storage area. Verification that the selected data record has not been modified since the time that is was copied to the second storage area is based upon the identifier, and then the command is executed.

22 Claims, 3 Drawing Sheets

OPTIMIZING COMMAND EXECUTION IN DATABASE SYSTEMS THAT PROVIDE SUPPORT FOR UPDATABLE SCROLLABLE CURSORS

FIELD OF THE INVENTION

The present invention is directed to an improvement in computing systems and in particular to optimizing command execution in computer database systems that provide support for updatable scrollable cursors.

BACKGROUND OF THE INVENTION

The Open Database Connectivity (ODBC) specification supports updatable scrollable cursors for Relational Database Management Systems (RDBMSs). This standard provides that multiple cursors may be defined for tables in relational databases and that positioned UPDATEs and DELETEs may be performed on the tables based on the scrollable cursor's location. The ODBC standard also provides for an attribute in the database to define an optimistic concurrency scheme. In the ODBC standard this attribute is referred to as SQL_CONCUR_VALUES. Use of the SQL_CONCUR_VALUES attribute provides that a positioned UPDATE or DELETE succeeds only if the record data to be modified has not been changed since it was last fetched by the user.

In certain relational database systems such as the DB2 UDB (trade-mark) RDBMS, for each scrollable cursor a temporary copy of record data is made when the data is fetched by the user. Where the SQL_CONCUR_VALUES attribute is applied, and a positioned UPDATE or DELETE is to be carried out, the temporary copy of record data must be compared to the current record data in the database to ensure that the record data has not changed since the time that it was copied to the temporary location. A comparison of the record in the temporary copy with the record in the current table may result in significant overhead cost for the UPDATE or DELETE where the records to compare are extensive.

It is therefore desirable to have a relational database system that will support the ODBC updatable scrollable cursors and the SQL_CONCUR_VALUES attribute in which it is possible to optimize the steps to carry out the positioned UPDATE or DELETE commands.

SUMMARY OF THE INVENTION

A system, method and computer readable medium containing programming instructions for optimizing command execution in a database system is disclosed. According to one embodiment of the present invention, the database system stores data records on data pages, and provides a log sequence number for each data page. The log sequence number indicates when any of the data records contained in the data page were last modified. A data record is selected from a data page and copied to a second storage area. The present invention verifies that the selected data record has not been modified since the time that is was copied to the second storage area based upon the log sequence number, and then executes the command.

Advantages of the present invention include a reduction in processing time of database UPDATE or DELETE operations based on scrollable cursors where there is support for optimistic concurrency.

Figure 1:
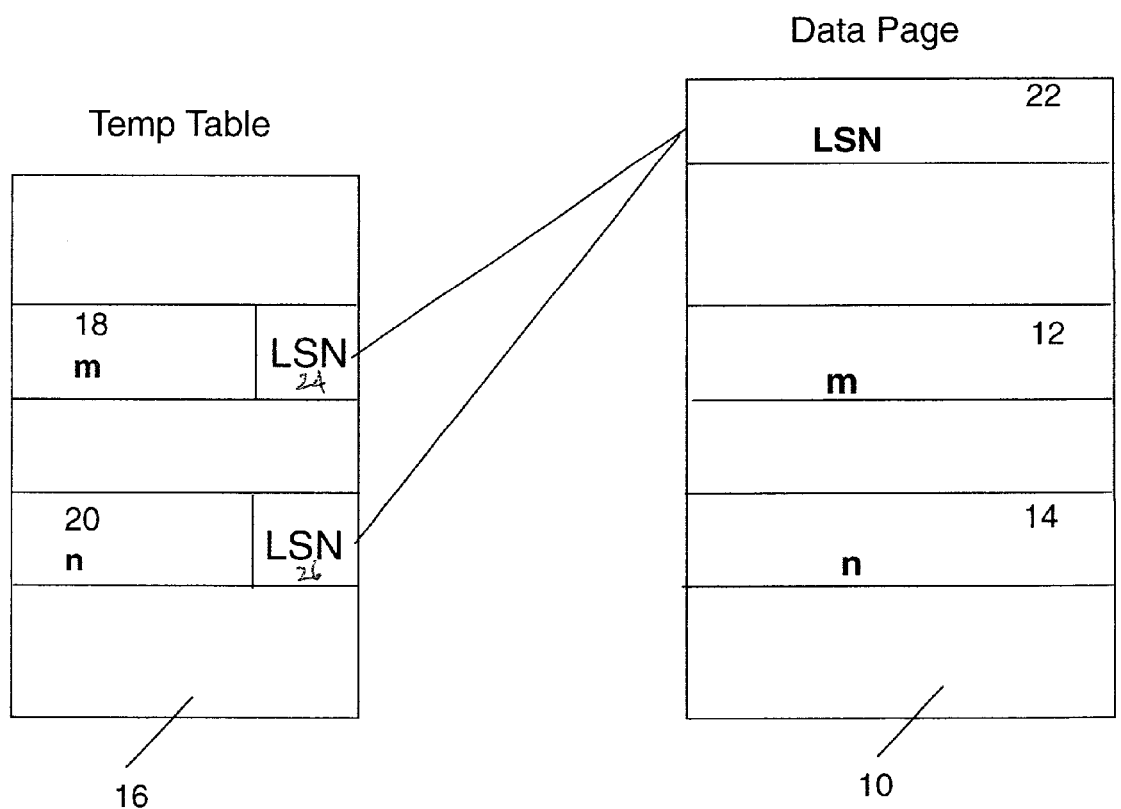
FIG. 1 is a block diagram representing example tables in a database subject to the optimization of the preferred embodiment.

In the drawings, the preferred embodiment of the invention is illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

Figure 2:
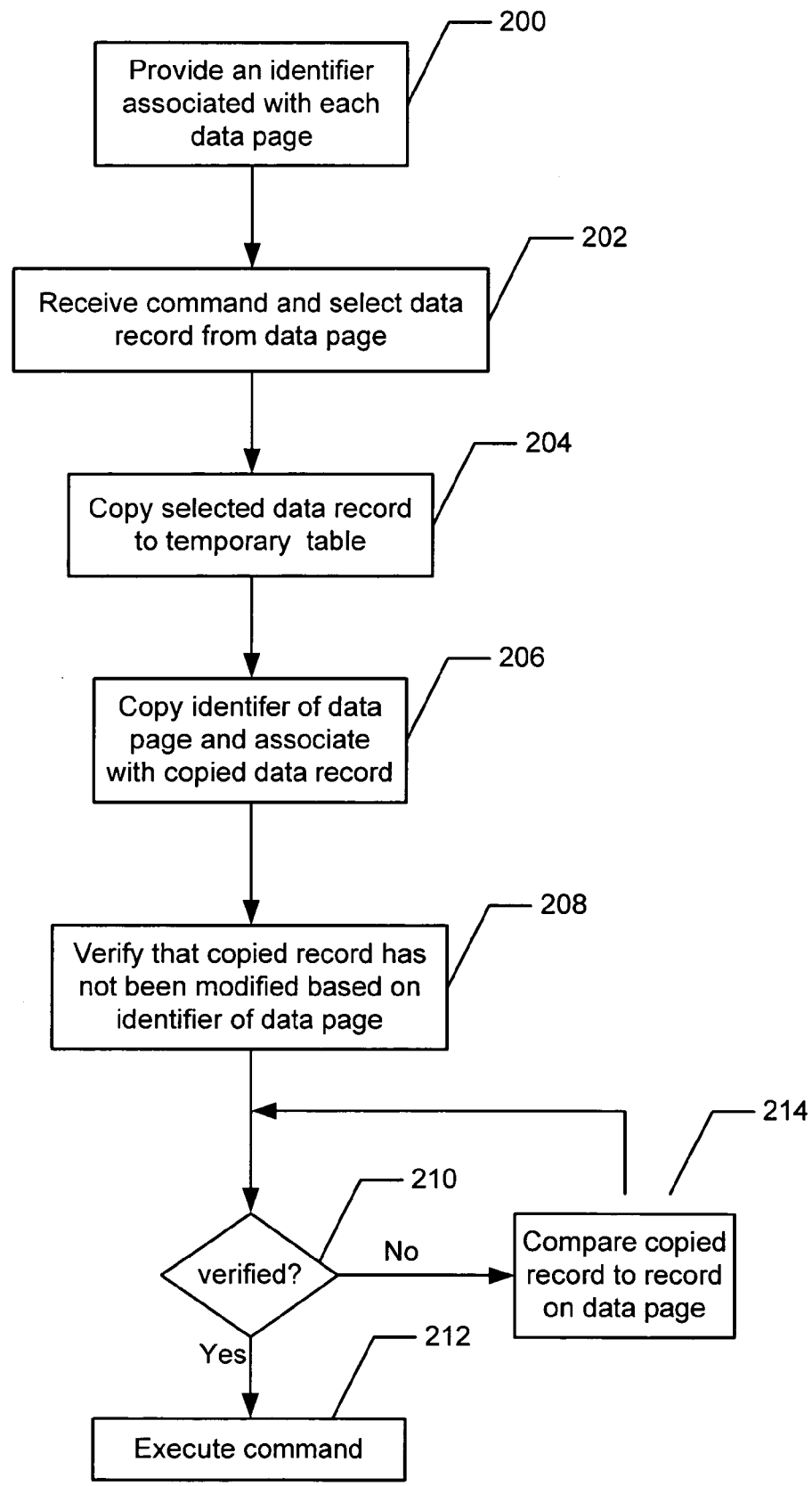
FIG. 2 is a flowchart illustrating a method for optimizing command execution in a database system according to a preferred embodiment of the present invention.

FIG. 1 illustrates, in a block diagram, data which is subject to the optimization of the preferred embodiment. FIG. 2 is a flowchart illustrating a method for optimizing command execution of such data according to a preferred embodiment. FIG. 1 shows a portion of a relational database containing rows m and n, shown as records 12, 14 in the figure. FIG. 1 also shows a temp table 16 in which data corresponding to rows m and n are shown as records 18, 20.

In the preferred embodiment, records in the relational database are stored on pages. The process of FIG. 2 begins when each page has an identifier, such as a log sequence number (LSN), associated with the page (step 200). In FIG. 1, data page 10 is shown with associated LSN 22. The LSN for the data page includes information which effectively provides a time stamp of the last modification made to any table data (records) on that page. With reference to the example of FIG. 1, LSN 22 is updated when either record 12 or record 14, or any other record stored on data page 10, is modified in any way.

As is indicated in FIG. 1 and FIG. 2, according to the preferred embodiment, a copy of the data page LSN is maintained in association with a record when that record is written to temp table 16. Temp table 16 is used to copy row values when an updatable scrollable cursor is used to retrieve table record values for a user. Referring to FIG. 1 and FIG. 2, a cursor has been used to select rows m and n (step 202) and therefore the row m value in record 12 in data page 10 is copied to record 18 in temp table 16 (step 204). Similarly the row n value in record 14 is copied to temp table 16 record 20 when a cursor in table is used to fetch row n for a user.

In the preferred embodiment, when record 18 having the value of row m is stored in temp table 16, a copy of LSN 22 is made and stored in the temp table 16 in association with record 18 (step 206). This is shown in FIG. 1 as LSN 24. Similarly, a copy of LSN 22 is made in association with record 20 when the value of row n is copied to temp table 16. This associated LSN value is shown as LSN 26 in FIG. 1.

Due to the concurrency available in the ODBC standard, it is possible for row m to be copied to temp table 16 from data page 10 with the then current value of a LSN 22 being copied to LSN 24 and to then have a subsequent modification to data page 10 before the cursor reaches row n (in the table record 14). As a result, row n values may be copied into record 20 in temp table 16 with LSN value 26 that differs from LSN 24. This is due to a change to the value of LSN 22 when the data page 10 values are modified prior to copying the value of row n into temp table 16.

In the preferred embodiment, where SQL_CONCUR_VALUES attribute is associated with the table containing data page 10, and an UPDATE or DELETE operation is specified for, for example, row m or row n, based on the position of a cursor, it is necessary to ensure that the value of rows m and n as stored in temp table 16 are the same as the values as stored in data page 10. Although this may be carried out by a direct comparison of the attribute values in the respective rows in temp table 16 and data page 10, the preferred embodiment verifies that the selected row values have not been modified based on the identifier associated with the page (step 210).

Figure 3:
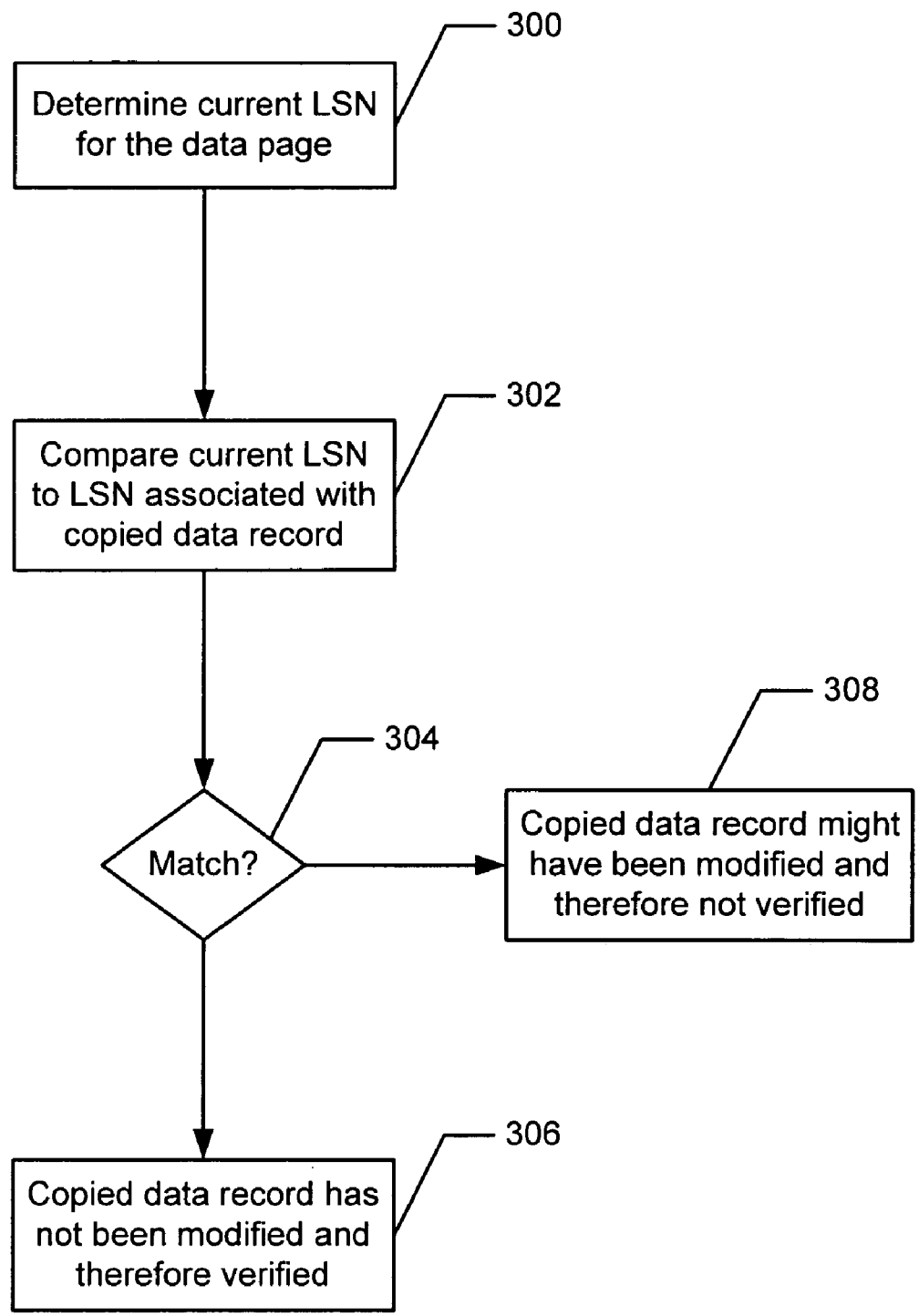
FIG. 3 is a flowchart illustrating a process for verifying the accuracy of the selected row value according to a preferred embodiment of the present invention.

FIG. 3 is a flowchart illustrating a process for verifying the accuracy of the selected row value according to a preferred embodiment of the present invention. The process begins by determining the current value of the LSN 22 of the data page 10 from which the selected value 18 was copied (step 300). The current LSN 22 is then compared to the LSN value 24 associated with the selected value 18 (step 302). If the values match (step 304), it is necessarily the case that record 12 has not been modified since a copy of the value of row m was copied into record 18 in temp table 16. Thus, the selected record 18 is verified (step 306). If record 12 had been modified, the value of LSN 22 would have changed and there would therefore not be a match between the value of LSN 22 and the value of LSN 24, and the selected record 18 would not be verified (step 308). In this manner, it is possible to avoid comparing all attribute values of record 12 and of record 18 by carrying out the simple comparison of the value of LSN 24 and the value of LSN 22. Referring again to FIG. 2, where these values are different, i.e., are not verified (step 210), it will be necessary to carry out the direct comparison of record 12 and record 18 (step 214). However, this step may be avoided where the values of LSN 24 and LSN 22 are found to match (step 210). Where this is the case, the user will be able to directly execute a command (step 212). e.g. update the value of record 12, and rely on the record 18 value as corresponding to record 12.

In the implementation of the preferred embodiment, the retrieval and comparison of LSN values is carried out using an internal command referred to as FETCH SENSITIVE NO DATA. The operations carried out by the FETCH SENSITIVE NO DATA internal command result in the LSN for the data page and the LSN for the record in the temp table being retrieved and compared, as is described above. In this way, the RDBMS of the preferred embodiment is able to execute the FETCH SENSITIVE NO DATA command as a part of the steps taken by the RDBMS in optimizing execution of UPDATE or DELETE commands in response to a user request.

The preferred embodiment is described above with respect to the UPDATE and DELETE commands where a RDBMS supports optimistic concurrency for a scrollable cursor. The optimization of the preferred embodiment may also be used in implementing other commands in an RDBMS which include a temporary table copy of a record, and require a confirmation that the temp table copy is equivalent to the database copy.

An example of such an implementation of the optimization of the preferred embodiment is with respect to the FETCH SENSITIVE command in the DB2 UDB™ RDBMS. The FETCH SENSITIVE command is available to users (in contrast to the FETCH SENSITIVE NO DATA command referred to above which is used internally in the RDBMS, only). Execution of the command, without any optimization, results in the fetch of a record from the database table and the qualification of that record (its attribute values are compared with the SQL predicates associated with the command). Where the record qualifies, the temp table is updated and the record is returned to the user.

The optimization of the preferred embodiment makes it possible to use the value of the LSN stored in the temp table to avoid steps in carrying out the command. Where the row m, for example, has been previously fetched and is in temp table 16, and the value of LSN 24 is equivalent to data page 10 LSN 22, a FETCH SENSITIVE command carried out on row m may be implemented by positioning the cursor at the appropriate record and returning a flag to the user to indicate that the previously fetched values remain current. If the two LSN values are not equal, then the non-optimized steps to carryout the FETCH SENSITIVE command are followed.

Using the comparison of the LSN value associated with the temp table record and the LSN value of the data page, the copying of attribute values to the temp table may be avoided. In this manner, the optimization of the preferred embodiment may be used to increase efficiency in carrying out command execution in a database with updatable scrollable cursors.

Although a preferred embodiment of the present invention has been described here in detail, it will be appreciated by those skilled in the art, that variations may be made thereto, without departing from the spirit of the invention or the scope of the appended claims.

What is claimed is:

1. A method for optimizing command execution in a database system, wherein data records are stored on a plurality of data pages therein, the method comprising the steps of:
    (a) providing an identifier to each data page, the identifier indicating when any of the data records contained therein were last modified;
    (b) selecting a data record from a data page;
    (c) copying the selected data record and the identifier of the data page to a second storage area;
    (d) verifying that the selected data record has not been modified since the time that it was copied to the second storage area based upon the stored identifier and a current identifier of the date page; and
    (e) executing the command.

2. The method of claim 1, wherein the verifying step (d) includes:
    (d1) determining the current identifier for the data page;
    (d2) comparing the current identifier with the stored identifier; and
    (d3) concluding the selected data record has not been modified when the current identifier is the same as the stored identifier.

3. The method of claim 1, wherein the verifying step (d) further includes:
    (d4) determining whether the selected data record has not been modified when the current identifier is not the same as the stored identifier by:
    (d4a) accessing a current version of the selected data record on the data page; and
    (d4b) comparing the selected data record with the current version of the selected data record.

4. The method of claim 3, wherein the identifier comprises a time stamp.

5. The method of claim 3, wherein the identifier comprises a log sequence number (LSN).

6. The method of claim 1, wherein the second storage area is a temporary data record in a temporary table.

7. The method of claim 1, wherein the command is a positioned UPDATE and DELETE command in a relational database system supporting scrollable cursors and optimistic concurrency.

8. A computer readable medium containing programming instructions for optimizing command execution in a database system, wherein data records are stored on a plurality of data pages therein, the programming instructions for:
   (a) providing an identifier to each data page, the identifier indicating when any of the data records contained therein were last modified;
   (b) selecting a data record from a data page;
   (c) copying the selected data record to a second storage area;
   (d) verifying that the selected data record has not been modified since the time that it was copied to the second storage area based upon the identifier; and
   (e) executing the command.

9. The computer readable medium of claim 8, wherein the verifying instruction (d) includes:
   (d1) determining a current identifier for the data page;
   (d2) comparing the current identifier with the stored identifier; and
   (d3) concluding the selected data record has not been modified when the current identifier is the same as the stored identifier.

10. The computer readable medium of claim 9, wherein the verifying instruction (d) further includes:
   (d4) determining whether the selected data record has not been modified when the current identifier is not the same as the stored identifier by:
   (d4a) accessing a current version of the selected data record on the data page; and
   (d4b) comparing the selected data record with the current version of the selected data record.

11. The computer readable medium of claim 10, wherein the identifier comprises a log sequence number (LSN).

12. The computer readable medium of claim 10, wherein the identifier comprises a time stamp.

13. The computer readable medium of claim 8, wherein the second storage area is a temporary data record in a temporary table.

14. The computer readable medium of claim 8, wherein the command is a positioned UPDATE and DELETE command in a relational database system supporting scrollable cursors and optimistic concurrency.

15. A relational database management system comprising:
   data records stored on a plurality of data pages;
   means for providing an identifier on each data page, the identifier indicating when any of the data records contained therein were last modified;
   means for selecting a data record from a data page;
   means for copying and storing the selected data record and the identifier from the data page to a second storage area;
   means for determining a current identifier from the data page; and
   means for verifying that the selected data record has not been modified since the time that it was copied to the second storage area by determining that the stored identifier is the same as the current identifier from the data page.

16. The system of claim 15, wherein the second storage area is a temporary data record in a temporary table.

17. The system of claim 15, wherein the relational database management system supports a positioned UPDATE and DELETE command and scrollable cursors and optimistic concurrency.

18. The system of claim 15, wherein the identifier comprises a log sequence number (LSN).

19. The system of claim 15, wherein the identifier comprises a time stamp.

20. A method for optimizing command execution in a database system, wherein data records are stored on a plurality of data pages therein, the method comprising the steps of:
   (a) providing an identifier to each data page, the identifier indicating when any of the data records contained therein were last modified;
   (b) selecting a data record from a data page;
   (c) copying the selected data record and copying and storing the identifier to a second storage area;
   (d) verifying that the selected data record has not been modified since the time that it was copied to the second storage area based upon the identifier by:
      (d1) determining a current identifier for the data page;
      (d2) comparing the current identifier with the stored identifier, and
      (d3) concluding the selected data record has not been modified when the current identifier is the same as the stored identifier; and
   (e) executing the command.

21. A computer readable medium containing programming instructions for optimizing command execution in a database system, wherein data records are stored on a plurality of data pages therein, the programming instructions for:
   (a) providing an identifier to each data page, the identifier indicating when any of the data records contained therein were last modified;
   (b) selecting a data record from a data page;
   (c) copying the selected data record and copying and storing the identifier to a second storage area;
   (d) verifying that the selected data record has not been modified since the time that it was copied to the second storage area based upon the identifier by:
      (d1) determining a current identifier for the data page;
      (d2) comparing the current identifier with the stored identifier, and
      (d3) concluding the selected data record has not been modified when the current identifier is the same as the stored identifier; and
   (e) executing the command.

22. A relational database management system comprising:
   data records stored on a plurality of data pages;
   means for providing an identifier on each data page, the identifier indicating when any of the data records contained therein were last modified;
   means for selecting a data record from a data page;
   means for copying and storing the selected data record and the identifier from the data page to a second storage area;
   means for determining a current identifier from the data page; and
   means for verifying that the selected data record has not been modified since the time that it was copied to the second storage area by comparing the identifier stored in the second storage area with the current identifier, and concluding that the selected data record has not been modified if the stored identifier is the same as the current identifier.

* * * * *

UNITED STATES PATENT AND TRADEMARK OFFICE
CERTIFICATE OF CORRECTION

PATENT NO. : 7,010,552 B2  
DATED : March 7, 2006  
INVENTOR(S) : Iqbal A. Goralwalla et al.

It is certified that error appears in the above-identified patent and that said Letters Patent is hereby corrected as shown below:

<u>Column 5,</u>  
Line 15, after "record" add -- and the identifier of the data page --.  
Line 19, after "the" add -- stored identifier and a current --.  
Line 19, after "identifier" add -- of the data page --.  
Line 23, remove "determining a" and replace with -- determining the --.

Signed and Sealed this

Thirtieth Day of May, 2006

JON W. DUDAS  
*Director of the United States Patent and Trademark Office*